Patented June 23, 1953

2,643,249

UNITED STATES PATENT OFFICE 2,643,249

METHOD OF OBTAINING CRYSTALLINE SALTS OF STREPTOMYCINS

Leon J. Heuser, Robbinsville, N. J., assignor to Mathieson Chemical Corporation, New York, N. Y., a corporation of Virginia No Drawing. Application September 23, 1950, Serial No. 186,486

10 Claims. (Cl. 260—210)

This application is a continuation-in-part of my application Serial No. 36,432, filed July 1, 1948, now abandoned.

This invention relates to streptomycins.

In 1944, Schatz, Bugie, and Waksman (Proc. Soc. Exp. Biol. Med. 1944, 57, 244) showed that a potent antibiotic, termed streptomycin, was formed during the growth of the organism *Actinomyces griseus* (now called *Streptomyces griseus*); and this antibiotic has since been established to be of high clinical utility.

It was later found that a number of streptomycins are formed at the same time. The first streptomycin obtained as a pure crystalline derivative (the reineckate) and fully characterized was originally referred to as "streptomycin A," and is now referred to as "N-methyl-L-glucosaminidostreptosidostreptidine," or simply as "streptomycin"; the second streptomycin characterized was originally referred to as "streptomycin B," and is now referred to as "D-mannosido-N-methyl-L-glucosaminidostreptosidostreptidine," or as "mannosidostreptomycin"; and the crude or partially-purified mixture of streptomycins is now referred to as "streptomycin complex" (cf. Science, 107, 233–234, March 5, 1948). The term "streptomycins" (or "a streptomycin") logically (and herein) identifies the genus (or a member of the genus) comprising streptomycin, mannosidostreptomycin, and streptomycin complex.

Streptomycins have been purified by various methods, the early methods being generally complicated and/or inefficient (and consequently expensive). Recently, simple, efficient and otherwise advantageous methods of purifying streptomycins have been provided, these improved methods being the subject of certain U. S. applications [Lott, Bernstein, and Heuser applications Serial Numbers 767,851 and 767,852, filed August 9, 1947, now Patents Nos. 2,537,933 and 2,537,934, respectively, dated January 9, 1951]. These improved purification methods are based on findings that: the streptomycins interact with surface-active agents of the organically-substituted polybasic-inorganic-acid type to form salt-type combinations which are much less soluble in water (and more soluble in certain organic solvents) than the streptomycins; and that such salt-type derivatives of the streptomycins may be recovered and converted into simple mineral-acid salts of streptomycins in purified form.

One of these methods (cf. Patent No. 2,537,933) essentially comprises intimately contacting an aqueous solution of the impure streptomycin (e. g., a primary streptomycin-containing liquid, or an aqueous solution of a partially-purified streptomycin, such as the eluate from the charcoal adsorbate) with a surface-active agent of the organically-substituted polybasic-inorganic-acid type and a substantially water-immiscible organic solvent for soaps (including invert soaps), preferably with a substantially water-immiscible aliphatic alcohol; separating the organic solvent phase; and recovering the salt-type derivative of the streptomycin therein and/or converting it to a water-soluble salt of the streptomycin (as by intimately contacting the organic solvent solution with an aqueous, water-soluble, relatively-strong acid, and recovering the aqueous phase).

The other of these methods (cf. Patent No. 2,537,934) essentially comprises: treating the impure streptomycin with the surface-active agent in a solvent for the reactants (especially water); recovering the formed, relatively water-insoluble salt-type combination derived from the streptomycin and surface-active agent (by filtration, for example); and converting the latter combination into a water-soluble salt of the streptomycin (as by dissolving the combination in a solvent therefor, treating the solution with an aqueous, water-soluble relatively-strong acid, and recovering the formed water-soluble salt of the streptomycin).

The water-soluble salt (of the streptomycin) obtained by these improved purification treatments is considerably purer than the streptomycin treated, and the recovery of streptomycin activity is of a high order (it being possible to obtain uniformly high yields of relatively-pure streptomycin complex, for example, having a potency above about 400 units/mg.).

Streptomycin complex has been partially and completely separated into streptomycin and mannosidostreptomycin by various methods described in the literature (some of which are referred to hereinafter); and by modification of the production process it has been possible to increase the proportion of streptomycin in the complex. Moreover, the (separated) streptomycins have been obtained as crystalline derivatives. Thus, streptomycin has been obtained as the crystalline reineckate-sulfate (Science, 104, 273, 1946), crystalline helianthate (J. A. C. S., 67, 1866, 1945), and as the crystalline calcium-chloride double salt (J. A. C. S., 67, 1966, 1945); and mannosidostreptomycin has been obtained as the crystalline reineckate (J. Biol. Chem., 168, 391, 1947). The only one of these crystalline forms utilizable clinically is the calcium-chloride double salt, but its utility is impaired by its having a complex composition. Despite the obvious desirability of crystalline, simple mineral-acid salts of streptomycins (and the consequently numerous attempts made to obtain them), no one, so far as applicants are aware, has been able to obtain them.

It is the object of this invention to provide certain crystalline salts of streptomycins; namely, the hydrochloric, hydrobromic and nitric acid salts (especially the hydrochloric), and advantageous methods of obtaining them; and it is an additional object of this invention to provide improved methods of purifying streptomycins.

In the practice of this invention, streptomycins are purified and/or obtained as these crystalline salts by: treating salt-type combinations derived from streptomycins and certain surface-active agents of the organically-substituted polybasic-inorganic-acid type with a member of the group consisting of calcium chloride, calcium bromide, calcium nitrate, and the corresponding acids, in a medium essentially comprising methanol; and recovering the formed crystalline salt of the streptomycin. Among the surface-active agents of the organically-substituted polybasic-inorganic-acid type from which salt-type combinations with streptomycins may be derived for the purposes of this invention are:

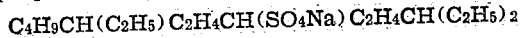

$C_4H_9CH(C_2H_5)C_2H_4CH(SO_4Na)C_2H_4CH(C_2H_5)_2$

[e. g., Tergitol Penetrant 7], and

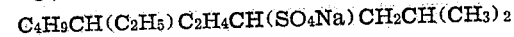

$C_4H_9CH(C_2H_5)C_2H_4CH(SO_4Na)CH_2CH(CH_3)_2$

[e. g., Tergitol Penetrant 4], especially the former.

There are indications that the crystalline salts of this invention differ from the corresponding amorphous salts in a respect other than purity or crystalline form. Thus, there are the following indications, inter alia, that crystalline streptomycin trihydrochloride, for example, differs from the amorphous salt in tautomeric form: pure amorphous streptomycin trihydrochloride cannot be crystallized by conventional procedures; crystalline streptomycin trihydrochloride may be converted into crystalline streptomycin sesquisulfate by treatment with sulfuric acid or guanidine sulfate, whereas pure amorphous streptomycin trihydrochloride yields no crystals when similarly treated; and crystalline streptomycin trihydrochloride can be recrystallized by dissolving the crystals in water at high concentration and then adding methanol, whereas if the aqueous solution is allowed to stand for several days, even at 5° C., before adding the methanol, recrystallization cannot be effected.

The following examples are illustrative of the invention:

Example 1

(a) 5 g. streptomycin trihydrochloride containing 6% mannosidostreptomycin trihydrochloride [obtained from a streptomycin complex by chromatographic separation on alumina, as described in J. Biol. Chem. 160, 337 (1945) and J. A. C. S. 68, 1460 (1946)] is dissolved in 150 ml. water, and 25 ml. of a 25% solution of

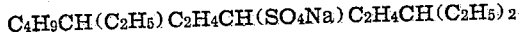

$C_4H_9CH(C_2H_5)C_2H_4CH(SO_4Na)C_2H_4CH(C_2H_5)_2$

[e. g., Tergitol Penetrant 7] in water is added with agitation. After standing an hour, the precipitated salt-type combination (tergitate) is filtered off and dried (yield about 11.5 g.).

(b) The tergitate is dissolved in 75 ml. methanol; the solution is filtered; the filtrate is mixed with 25 ml. of a 10% solution of calcium chloride in methanol; and a drop of concentrated hydrochloric acid is added. On standing, streptomycin trihydrochloride crystallizes with two molecules of water of crystallization as monoclinic prisms showing birefringence (yield about 1.37 g.).

When assayed with K. pneumoniae in a broth-dilution test, the dihydrate has a potency of about 820 units/mg. (and on this basis, the anhydrous product has a potency of about 891 units/mg.). On heating, the dihydrate decomposes gradually without melting; and when the dihydrate is dried at 55° C. in vacuo, it has the following analytical composition: C, 34.86%; H, 6.36%; and Cl, 14.25% (calculated for $C_{21}H_{39}N_7O_{12}\cdot 3HCl\cdot 2H_2O$: C, 34.54%; H, 6.36%, and Cl, 14.57%).

After drying in vacuo at 100° C., the (anhydrous, crystalline) product has an $[\alpha]_D^{26.6°\,C.}$ of about $-86.1°$ (1.0% in water), and the following analytical composition: C, 36.27%; H, 6.14%; N, 14.29%; and Cl, 15.68% (calculated for $C_{21}H_{39}O_{12}\cdot 3HCl$: C, 36.50%; H, 6.13%; N, 14.19%; and Cl, 15.40%).

A modification of the Craig counter-current distribution technique (J. Biol. Chem., 174, 57, 1948) to permit quantitative estimation shows the crystalline product to be a single compound and hence free of mannosidostreptomycin.

The streptomycin trihydrochloride dihydrate may be recrystallized by dissolving in hot methanol, filtering, and cooling. The recrystallized product is in the same crystalline form.

Example 2

(a) 1.4 g. mannosidostreptomycin trihydrochloride containing 7% streptomycin trihydrochloride [obtained from a streptomycin complex by chromatographic separation on alumina, as described in J. Biol. Chem., 168, 391 (1947)] is dissolved in 75 ml. water, and 7.5 ml. of a 25% solution of Tergitol Penetrant 7 in water is added with agitation. After standing an hour, the precipitated tergitate is filtered off and dried (yield about 2.9 g.).

(b) The tergitate is dissolved in 25 ml. methanol; and the solution is mixed with 4 ml. of a 10% solution of calcium chloride in methanol, isotropic hexagonal plates crystallizing out immediately (yield about 250 mg.).

The product (essentially mannosidostreptomycin trihydrochloride dihydrate), after drying at 55° C. in vacuo, has the following analysis: C, 36.45%; H, 6.26%; Cl, 12.14% (calculated for $C_{27}H_{49}N_7O_{17}\cdot 3HCl\cdot 2H_2O$: C, 36.47%; H, 6.35%, and Cl, 11.96%). When dried at 100° C. in vacuo, the (anhydrous, crystalline) product has an $[\alpha]_D^{26.6°\,C.}$ of $-54.1°$ (1% in water), a potency of about 246 units/mg. (when assayed with K. pneumoniae in a broth dilution test), and the following analysis: C, 38.25%; H, 6.22%; N, 11.31%; and Cl, 12.52% (calculated for $C_{27}H_{49}N_7O_{17}\cdot 3HCl$: C, 38.01%; H, 6.14%; N, 11.49%; and Cl, 12.47%).

Counter-current distribution shows the crystalline product to contain less than 5% streptomycin.

Example 3

(a) 0.1 g. mannosidostreptomycin trihydrochloride containing a negligible amount of streptomycin trihydrochloride is dissolved in 10 ml. water, and 0.4 ml. of a 25% solution of Tergitol Penetrant 7 in water is added with agitation; and the precipitated tergitate is filtered off and dried (yield about 0.2 g.).

(b) The tergitate is dissolved in 2 ml. methanol; the solution is mixed with 0.5 ml. of a 10% solution of calcium chloride in methanol; and the crystals formed (hexagonal prisms) are filtered off and dried (yield about 30 mg.).

The product (mannosidostreptomycin trihydrochloride dihydrate) has a potency of about 210 units/mg. and substantially the same analysis as the mannosidostreptomycin trihydrochloride dihydrate described in the preceding example; and counter-current distribution shows it to be free of streptomycin.

Example 4

(a) 15 g. of a crude streptomycin-complex tergitate [obtained from streptomycin complex and Tergitol Penetrant 7 as described in application Serial No. 767,852, referred to hereinbefore, and having a potency of the order of 200 units/mg.] is dissolved in 100 ml. amyl acetate, and 22 ml. of a 25% solution of ferric chloride in amyl acetate is added. The precipitate formed is filtered off, and dissolved in water; the solution neutralized with neutral anion-exchange resin [e. g., Amberlite IR-4B], and filtered; and the filtrate is freeze-dried, yielding about 3.6 g. of streptomycin-complex trihydrochloride having a potency of about 470 units/mg. On further addition of 44 ml. of the ferric chloride solution to the amyl-acetate mother liquor, a second precipitate is obtained, which on treatment by the same procedure as the first precipitate yields about 0.6 g. of the streptomycin-complex trihydrochloride having a potency of about 590 units/mg.

(b) The second product (i. e., that of about 590 units/mg. potency) is converted to the tergitate (with Tergitol Penetrant 7), and the tergitate is decomposed with calcium chloride in methanol as described in the preceding examples, yielding about 100 mg. crystalline streptomycin-complex trihydrochloride (dihydrate) having a potency of about 750 units/mg. Drying of the product in vacuo at 100° C. yields anhydrous crystalline streptomycin-complex trihydrochloride.

Example 5

8 g. of a crude streptomycin-complex tergitate (cf. section a of Example 4) is dissolved in 75 ml. methanol; the solution is filtered; and 25 ml. of a 10% solution of calcium chloride in methanol is added to the filtrate, and the solution seeded with crystalline streptomycin trihydrochloride [some batches crystallize spontaneously and hence do not require seeding]. On standing, streptomycin-complex trihydrochloride (dihydrate) crystallizes out, and is filtered off. The product, obtained in a yield of about 400 mg., has a potency of about 721 units/mg.

Example 6

4 g. of a crude streptomycin-complex tergitate (cf. section a of Example 4) is dissolved in 40 ml. methanol, and 5 ml. concentrated (i. e., about 36%) hydrochloric acid is added slowly at room temperature. The flocculent precipitate formed is filtered off, slurried in methanol, and refiltered, yielding about 260 mg. of a crystalline streptomycin-complex trihydrochloride (dihydrate) having a potency of about 650 units/mg. [The original mother liquor, on standing, yields about 190 mg. additional crystalline streptomycin-complex trihydrochloride (dihydrate), having a potency of about 505 units/mg.

Concentrated hydrochloric acid may be substituted for the methanol solution of calcium chloride used in Examples 1, 2 and 3 to obtain crystalline streptomycin trihydrochloride dihydrate and crystalline mannosidostreptomycin trihydrochloride dihydrate.

Example 7

20 g. of a crude streptomycin-complex tergitate (cf. section a of Example 4) is dissolved in a mixture of 75 ml. methanol and 25 ml. ethanol, and 50 ml. of a 10% solution of calcium chloride in methanol is added. On standing, a first crop (about 1.0 g.) of crystalline streptomycin-complex trihydrochloride (dihydrate) is obtained, having a potency of about 644 units/mg.

The ethanol component of the mixed solvent used in the foregoing example may be replaced by acetone, benzene or other solvent or solvents which reduce the solubility of streptomycin-complex trihydrochloride in methanol; and such mixed solvents may be used in place of the methanol used in Examples 1, 2 and 3 to obtain crystalline streptomycin trihydrochloride dihydrate and crystalline mannosidostreptomycin trihydrochloride dihydrate, as well as in place of the methanol used in the following examples.

Example 8

20 g. of a crude streptomycin-complex tergitate (cf. section a of Example 4) is dissolved in 100 ml. methanol, and 50 ml. of a 10% solution of calcium chloride in methanol containing 0.5 ml. concentrated hydrochloric acid is added. The reaction mixture is maintained at 5° C. for 3 hours, and the crystalline streptomycin trihydrochloride dihydrate formed is filtered off (yield, about 2.6 g.; potency about 836 units/mg.). [On adding acetone to the mother liquor until precipitation occurs, filtering off the precipitate, dissolving the precipitate in water, neutralizing the solution with an anion-exchange resin (e. g., Amberlite IR-4B), filtering, and freeze-drying the filtrate, about 1.8 g. of streptomycin-complex trihydrochloride (dihydrate) is obtained (potency about 495 units/mg.). By this means, the residual activity in the mother liquors in the other examples may be recovered, thus supplementing the yield of the crystalline product.]

Example 9

20 g. of a crude streptomycin-complex tergitate (cf. section a of Example 4) is dissolved in 200 ml. methanol, and 45 ml. of a 4.4 normal solution of HCl in methanol is added. After standing 12–16 hours, the crystalline streptomycin-complex trihydrochloride (dihydrate) formed is filtered off (yield, about 0.2 g.; potency, about 602 units/mg.).

Example 10

(a) An amount of crude wet streptomycin tergitate corresponding to 20 g. dry tergitate [obtained by precipitation with Tergitol Penetrant 7 from a filtered streptomycin-containing eluate] is mixed with 20 ml. methylal (the volume increasing to about 40 ml.); and the mixture is heated to 35° C. to effect solution. After standing an hour, the phases are separated by centrifuging, and the lower (methylal) layer recovered. [This procedure obviates the necessity of drying the tergitate before treatment to obtain a crystalline salt. Amyl acetate may be employed in place of methylal in this procedure.]

(b) The methylal solution of streptomycin tergitate is diluted to 110 ml. with methanol; and 70 ml. of a 10% solution of calcium chloride in methanol, containing 0.7 ml. concentrated hydrochloric acid, is added thereto with agitation at room temperature. Crystallization proceeds on standing at 5–10° C.; and after standing about 16 hours, the crystals of streptomycin trihydrochloride are filtered off, washed with 15 ml. fresh methanol, and dried at room temperature under vacuum. [Additional streptomycin may be recovered from the crystallization mother liquor by gradually adding thereto one and one-half times its volume of methylal while agitating, allowing the mixture to stand for two hours at 5° C., decanting, slurrying the precipitate in a small amount of water, neutralizing with neutral anion-exchange resin, filtering off the resin, and washing the resin free of streptomycin with water. The resulting solution may be added to the eluate treated with Tergitol as described in section (a).]

*Example 11*

20 g. of a highly pure (preferably crystalline) streptomycin tergitate [cf. section (a) of Example 1] is dissolved in 100 ml. methanol, and 50 ml. of a 10% solution of calcium bromide in methanol is added. On standing, streptomycin trihydrobromide crystallizes out (as monoclinic prisms), and is filtered off. After recrystallization by dissolving the crystals in water, filtering, and adding methanolic calcium bromide, the product has a potency of about 797 units/mg. (bio-assay), and gives the following approximate analysis: C, 30.97%; H, 5.53%; Br, 28.70%; and N, 11.07%. It is soluble in methanol to the extent of about 8.9 g./100 ml.

*Example 12*

20 g. of streptomycin tergitate [cf. Example 11] is dissolved in 100 ml. methanol, and 50 ml. of a 10% solution of calcium nitrate is added, followed by concentrated nitric acid dropwise until crystals (regular tetrahedrons) are formed; and these crystals of streptomycin trinitrate are filtered off. After recrystallization from methanol (by dissolving in methanol at 45° C., filtering, and allowing crystals to form), the product has a potency of about 733 units/mg. (bio-assay), and gives the following approximate analysis: C, 33.11%; H, 5.53%; N, 17.91%. It is soluble in methanol to the extent of about 5.0 g./100 ml.

The Tergitol Penetrant 7 used in the foregoing examples (or in preparing the tergitate used in the foregoing examples) may be replaced by $C_4H_9CH(C_2H_5)C_2H_4CH(SO_4Na)CH_2CH(CH_3)_2$ [e. g., Tergitol Penetrant 4]; and the (anhydrous) calcium chloride used in some of the foregoing examples may be replaced by calcium chloride dihydrate.

For the formation of crystalline hydrates of the streptomycin trihydrochlorides, some water must of course be present in the reaction medium. Such water may be supplied by the salt-type combinations of streptomycins and surface-active agents (these combinations being difficult to dry and hence usually containing some water), the methanol (which usually contains some water and absorbs water readily from the air), and/or other components of the reaction medium (e. g., the calcium chloride dihydrate and/or concentrated hydrochloric acid). The proportion of water should, of course, be insufficient to materially increase the solubility of the streptomycin trihydrochlorides in the methanolic solvent.

The crystalline, hydrated trihydrochlorides (for example) of streptomycins are less hygroscopic and less soluble in methanol than their amorphous progenitors; and by virtue of their purity and/or physical form, these crystalline salts lend themselves to subdivision and filling by weight, are especially suitable for conversion to dihydrostreptomycins by catalytic hydrogenation, and are otherwise advantageous.

To obtain crystalline streptomycin salts free of mannosidostreptomycin salts, the salt-type combination of the streptomycin and surface-active agent should be substantially pure, say contain no more than about 6% mannosidostreptomycin. Crystalline streptomycin-complex salts may be obtained from highly-purified streptomycin complexes of differing composition and origin, e. g., from the commercial streptomycin-complex preparations of different manufacturers.

The invention may be variously otherwise embodied within the scope of the appended claims.

I claim:

1. The method of obtaining a crystalline salt of a streptomycin, which comprises: treating a salt-type combination derived from the streptomycin and a member of the group consisting of $C_4H_9CH(C_2H_5)C_2H_4CH(SO_4Na)C_2H_4CH(C_2H_5)_2$ and $C_4H_9CH(C_2H_5)C_2H_4CH(SO_4Na)CH_2CH(CH_3)_2$ with a member of the group consisting of calcium chloride, calcium bromide, calcium nitrate, and any of these salts with the corresponding acid in a medium essentially comprising methanol; and recovering the formed crystalline salt of the streptomycin.

2. The method of obtaining a crystalline hydrochloric-acid salt of a streptomycin, which comprises: treating the streptomycin in water with a member of the group consisting of $C_4H_9CH(C_2H_5)C_2H_4CH(SO_4Na)C_2H_4CH(C_2H_5)_2$ and $C_4H_9CH(C_2H_5)C_2H_4CH(SO_4Na)CH_2CH(CH_3)_2$ recovering the formed relatively water-insoluble salt-type combination; treating the latter with calcium chloride in a medium essentially comprising methanol; and recovering the formed crystalline hydrochloric-acid salt of the streptomycin.

3. The method of obtaining a crystalline hydrochloric-acid salt of a streptomycin, which comprises: treating the streptomycin in water with $C_4H_9CH(C_2H_5)C_2H_4CH(SO_4Na)C_2H_4CH(C_2H_5)_2$ recovering the formed relatively water-insoluble salt-type combination; treating the latter with a solution of calcium chloride in methanol; and recovering the formed crystalline hydrochloric-acid salt of the streptomycin.

4. The method of obtaining a crystalline hydrochloric-acid salt of a streptomycin, which comprises: treating the streptomycin in water with $C_4H_9CH(C_2H_5)C_2H_4CH(SO_4Na)C_2H_4CH(C_2H_5)_2$ recovering the formed relatively water-insoluble salt-type combination; treating the latter with a solution of calcium chloride and hydrogen chloride in methanol; and recovering the formed crystalline hydrochloric-acid salt of the streptomycin.

5. The method of obtaining a crystalline hydrochloric-acid salt of a streptomycin, which comprises: treating the streptomycin in water with $C_4H_9CH(C_2H_5)C_2H_4CH(SO_4Na)C_2H_4CH(C_2H_5)_2$ recovering the formed relatively water-insoluble salt-type combination; treating the latter with a solution of calcium chloride dihydrate in methanol; and recovering the formed crystalline hydrochloric-acid salt of the streptomycin.

6. The method of obtaining crystalline streptomycin trihydrochloride, which comprises: treating substantially pure streptomycin in water with $$C_4H_9CH(C_2H_5)C_2H_4CH(SO_4Na)C_2H_4CH(C_2H_5)_2$$

recovering the formed relatively water-insoluble salt-type combination; treating the latter with calcium chloride in a medium essentially comprising methanol; and recovering the formed crystalline streptomycin trihydrochloride.

7. The method of obtaining crystalline mannosidostreptomycin trihydrochloride, which comprises: treating substantially pure mannosidostreptomycin in water with $$C_4H_9CH(C_2H_5)C_2H_4CH(SO_4Na)C_2H_4CH(C_2H_5)_2$$

recovering the formed relatively water-insoluble salt-type combination; treating the latter with calcium chloride in a medium essentially comprising methanol; and recovering the formed crystalline mannosidostreptomycin trihydrochloride.

8. The method of obtaining crystalline streptomycin-complex trihydrochloride, which comprises: treating a highly-purified streptomycin complex in water with $$C_4H_9CH(C_2H_5)C_2H_4CH(SO_4Na)C_2H_4CH(C_2H_5)_2$$

recovering the formed relatively water-insoluble salt-type combination; treating the latter with calcium chloride in a medium essentially comprising methanol; and recovering the formed crystalline streptomycin-complex trihydrochloride.

9. The method of obtaining crystalline streptomycin trihydrobromide, which comprises: treating streptomycin in water with $$C_4H_9CH(C_2H_5)C_2H_4CH(SO_4Na)C_2H_4CH(C_2H_5)_2$$

recovering the formed relatively water-insoluble salt-type combination; treating the latter with calcium bromide in a medium essentially comprising methanol; and recovering the formed crystalline streptomycin trihydrobromide.

10. The method of obtaining crystalline streptomycin trinitrate, which comprises: treating streptomycin in water with $$C_4H_9CH(C_2H_5)C_2H_4CH(SO_4Na)C_2H_4CH(C_2H_5)_2$$

recovering the formed relatively water-insoluble salt-type combination; treating the latter with calcium nitrate and nitric acid in a medium essentially comprising methanol; and recovering the formed crystalline streptomycin trinitrate.

LEON J. HEUSER.

References Cited in the file of this patent

UNITED STATES PATENTS

| Number | Name | Date |
|---|---|---|
| 2,446,102 | Peck | July 27, 1948 |
| 2,462,175 | Folkers | Feb. 22, 1949 |
| 2,537,933 | Lott et al. | Jan. 9, 1951 |
| 2,537,934 | Lott et al. | Jan. 9, 1951 |

OTHER REFERENCES

Kuehl—Science v. 102 (1945) pp. 34–35.
Le Page et al., v. 162 (1946) p. 165–170.